(12) United States Patent
Quinn

(10) Patent No.: US 8,758,628 B2
(45) Date of Patent: Jun. 24, 2014

(54) SENSOR ASSEMBLY FOR CONTROLLING WATER SOFTENER TANKS

(75) Inventor: Kerry Quinn, Palatine, IL (US)

(73) Assignee: Culligan International Company, Rosemont, IL (US)

( * ) Notice: Subject to any disclaimer, the term of this patent is extended or adjusted under 35 U.S.C. 154(b) by 759 days.

(21) Appl. No.: 12/246,343

(22) Filed: Oct. 6, 2008

(65) Prior Publication Data

US 2009/0090662 A1 Apr. 9, 2009

Related U.S. Application Data

(60) Provisional application No. 60/998,142, filed on Oct. 9, 2007.

(51) Int. Cl.
| | |
|---|---|
| C02F 1/42 | (2006.01) |
| B01J 47/00 | (2006.01) |
| B01J 47/14 | (2006.01) |
| B01J 49/00 | (2006.01) |
| B01D 15/36 | (2006.01) |
| B01D 15/18 | (2006.01) |

(52) U.S. Cl.
CPC ........ *B01D 15/1885* (2013.01); *B01D 15/1842* (2013.01); *B01J 49/0091* (2013.01); *B01J 49/0095* (2013.01); *B01J 47/14* (2013.01)
USPC ........... 210/739; 210/746; 210/660; 210/662; 210/670

(58) Field of Classification Search
None
See application file for complete search history.

(56) References Cited

U.S. PATENT DOCUMENTS

| | | | |
|---|---|---|---|
| 4,469,602 A | | 9/1984 | Seal |
| 4,539,091 A | * | 9/1985 | Kaneda et al. ................ 204/628 |
| 4,987,409 A | | 1/1991 | Jackson |
| 5,073,255 A | | 12/1991 | Chili et al. |
| 5,132,669 A | | 7/1992 | Jackson |
| 5,273,070 A | * | 12/1993 | Chili et al. ............... 137/599.15 |
| 5,699,272 A | | 12/1997 | Zabinski |
| 5,893,976 A | * | 4/1999 | Bauer ........................... 210/678 |
| 6,293,298 B1 | | 9/2001 | Brane et al. |
| 6,333,695 B2 | | 12/2001 | Young |
| 6,527,958 B1 | | 3/2003 | Carli et al. |
| 2001/0026225 A1 | | 10/2001 | Young |
| 2002/0017495 A1 | | 2/2002 | Iizuka et al. |
| 2004/0103930 A1 | | 6/2004 | Lee |
| 2004/0188330 A1 | | 9/2004 | Slawson et al. |
| 2004/0251187 A1 | * | 12/2004 | Chernoff ....................... 210/190 |
| 2006/0114593 A1 | | 6/2006 | Sagaert |
| 2007/0045191 A1 | | 3/2007 | Jeong |
| 2007/0119758 A1 | | 5/2007 | Duplessis et al. |

(Continued)

FOREIGN PATENT DOCUMENTS

| | | |
|---|---|---|
| CN | 1506166 A | 6/2004 |
| JP | 2003-136057 | 5/2003 |

*Primary Examiner* — Krishnan S Menon
(74) *Attorney, Agent, or Firm* — Greer, Burns & Crain, Ltd.

(57) ABSTRACT

A sensor assembly for a water softening system and includes a first treatment tank having a first valve assembly, a first flow meter and a sensor probe, a second treatment tank having a second valve assembly and a second flow meter and a brine tank independently connected to each of the first treatment tank and the second treatment tank. A controller is configured for communicating with the sensor probe and the first flow meter in the first treatment tank, and the second flow meter in the second treatment tank.

10 Claims, 1 Drawing Sheet

(56) References Cited

U.S. PATENT DOCUMENTS

| | | |
|---|---|---|
| 2007/0119759 A1 | 5/2007 | Duplessis et al. |
| 2007/0251831 A1* | 11/2007 | Kaczur et al. ............... 205/510 |
| 2008/0047881 A1 | 2/2008 | Buck et al. |

* cited by examiner

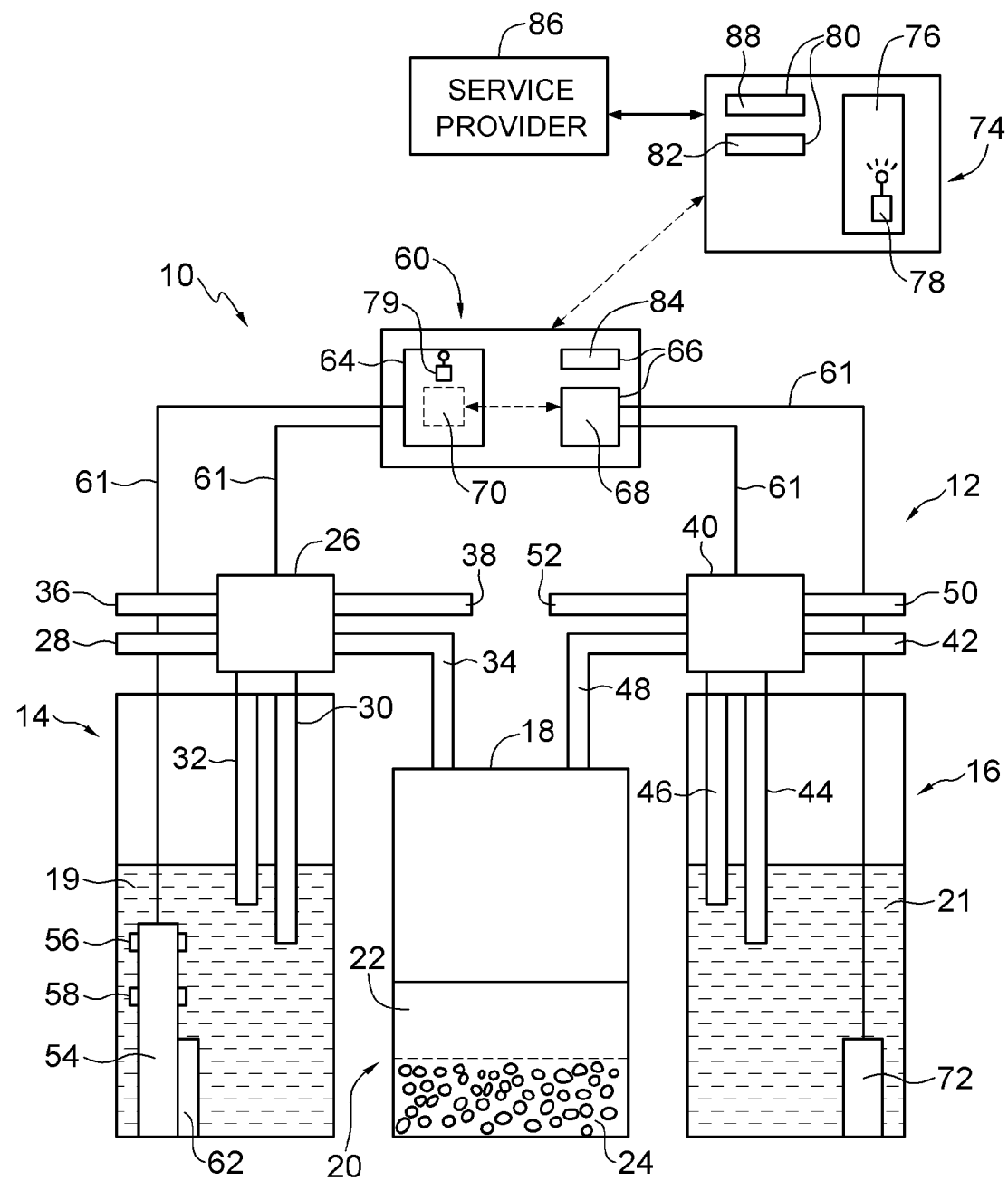

SENSOR ASSEMBLY FOR CONTROLLING WATER SOFTENER TANKS

PRIORITY CLAIM

This application claims priority to and the benefit of U.S. Provisional Application No. 60/998,142 filed on Oct. 9, 2007.

BACKGROUND OF THE INVENTION

The present invention relates generally to fluid treatment systems, such as water treatment systems including water softeners, and more particularly to a sensor assembly for a water softener system. It is recognized that many aspects of the present invention can be applied to other types of fluid treatment systems, such as filtering or de-ionizing systems.

Water softeners are well known in the art and typically include a raw water source, a treatment tank containing an ion exchange resin, a brine tank containing a brine solution, and a control valve for directing fluids between the source, the tanks and a drain or other output.

Water softening occurs by running water through the ion exchange resin, which replaces the calcium and magnesium cations in the water with sodium cations. As the ion exchange process continues, the resin eventually loses its capacity to soften water and must be replenished with sodium cations. The process by which the calcium and magnesium ions are removed, the capacity of the ion exchange resin to soften water is restored, and the sodium ions are replenished is known as regeneration.

During regeneration, brine, a concentrated or saturated salt solution, is passed through the ion exchange resin and the cations in the resin are replaced with sodium ions. Regeneration is a multi-step process incorporating a number of cycles, specifically, backwash, brine draw, rinse and refill cycles.

Typically, water softener systems include a treatment tank and a brine tank regulated by a single controller. Accordingly, when more than one treatment tank is desired (i.e., for enabling continuous servicing of the system, or for commercial or large residential applications), supplementary controllers are necessary for each additional treatment tank. Such applications increase manufacture cost of the system and the eventual cost to the user or consumer.

BRIEF SUMMARY

The present sensor assembly is configured for enabling a single controller to operate two treatment tanks, reducing manufacture and consumer costs.

Specifically, the present sensor assembly is utilized in a water softening system and includes a first treatment tank having a first valve assembly, a first flow meter and a sensor probe, a second treatment tank having a second valve assembly and a second flow meter and a brine tank independently connected to each of the first treatment tank and the second treatment tank. A controller is configured for communicating with the sensor probe and the first flow meter in the first treatment tank, and the second flow meter in the second treatment tank.

In another embodiment, the present sensor assembly is utilized in a water softening system and includes a first treatment tank having a first valve assembly, a first flow meter and a sensor probe, a second treatment tank having a second valve assembly and a second flow meter and a brine tank independently connected to each of the first treatment tank and the second treatment tank. A controller is configured for communicating with the sensor probe and the first flow meter in the first treatment tank, and the second flow meter in the second treatment tank. A remote display is in communication with the controller for allowing control of the first valve assembly and the second valve assembly from a remote location. The sensor probe includes a pair of vertically spaced electrodes configured for detecting an impedance difference of an ion exchange resin in the first treatment tank, and when the impedance reaches a predetermined level, the sensor probe sends a signal to the controller to indicate that regeneration is necessary, and triggers operation of the second treatment tank. Also, the second flow meter is configured for tracking a number of gallons of fluid flowing through the second treatment tank and when the number of gallons of fluid reaches a predetermined number of gallons, the controller sends a signal to the second valve assembly indicating that regeneration is necessary.

In another embodiment, a method for controlling a water softening system includes providing a first treatment tank having a first valve assembly, a first flow meter and a sensor probe, providing a second treatment tank having a second valve assembly and a second flow meter, independently connecting a brine tank to each of the first treatment tank and the second treatment tank, communicating with the sensor probe and the first flow meter in the first treatment tank, and the second flow meter in the second treatment tank and sending a message to an off-site service provider network reporting a condition of the water softening system.

DESCRIPTION OF THE SEVERAL VIEWS OF THE DRAWINGS

FIG. 1 is a schematic diagram showing the present sensor assembly for a twin tank water softening system.

DETAILED DESCRIPTION

Referring to FIG. 1, the present sensor assembly is generally designated 10 and is configured for use with a water softener assembly 12, which includes a first treatment tank 14 and a second treatment tank 16 each independently connected to a brine tank 18. As known in the art, the first and second treatment tanks 14, 16 are filled with an ion exchange resin 19, 21, respectively, and the brine tank 18 is filled with a brine solution 20 including water 22 and salt granules 24.

The first treatment tank 14 includes a first valve assembly 26 configured for controlling the water flow between a first raw water inlet 28, a first treatment tank inlet 30, a first treatment tank outlet 32, a first brine tank inlet/outlet 34, a first bypass outlet 36 for supplying water to the residence or commercial structure, and a first drain 38. Similarly, the second treatment tank 16 includes a second valve assembly 40 constructed and arranged for controlling the water flow between a second raw water inlet 42, a second treatment tank inlet 44, a second treatment tank outlet 46, a second brine tank inlet/outlet 48, a second bypass outlet 50 for supplying water to the residence or commercial structure, and a second drain 52. The specific operations of the valve assemblies 26, 40 are described in commonly owned and co-pending U.S. Application Serial No. 60/997,317, entitled CONTROL VALVE FOR A FLUID TREATMENT SYSTEM, filed Oct. 2, 2007 and herein incorporated by reference.

A sensor probe 54 is located in the first treatment tank 14, includes two pairs of vertically mounted electrodes 56, 58 and is electrically connected to a controller 60 via wiring 61 or the like. As known in the art, the electrodes 56, 58 are vertically spaced relative to each other for detecting the impedance difference of the ion exchange resin 19 in the first treatment tank 14. When the impedance difference between the second and first electrodes 58, 56 reaches a predetermined level, a signal is sent from the sensor probe 54 to the controller 60 indicating that the ion exchange resin 19 in the first treatment tank 14 is exhausted and regeneration is necessary. A preferred embodiment of the sensor probe 54 is commercially sold under the AQUASENSOR® trademark owned by Culligan International Company, and is disclosed in commonly-owned U.S. Pat. No. 5,699,272 entitled WATER SOFTENING SYSTEM WITH SELF-ADJUSTING RINSE CYCLE, incorporated by reference herein.

A first flow meter 62 is also provided within the first treatment tank 14 and is in communication with the controller 60. As known in the art, the flow meter 62 measures the number of gallons that flow through the first treatment tank 14 and is configured for communicating that value to the controller 60.

As seen in FIG. 1, the controller 60 includes a primary circuit board 64 that is in communication with the sensor probe 54 and the first flow meter 62 in the first treatment tank 14. The first valve assembly 26 is also electrically connected to the controller 60 by wiring 61 or similar cable, and is accordingly also in communication with the primary circuit board 64. At least one slot 66 is further included in the controller 60 for receiving a secondary circuit board 68 which is in communication with a microprocessor 70 in the primary circuit board 64.

To maintain communication between the first and second treatment tanks 14, 16, the second valve assembly 40 is hard-wire electrically connected to the controller 60, and specifically is in communication with the secondary circuit board 68. Further, the second treatment tank 16 includes a second flow meter 72 connected to the controller 60 by wiring 61 or the like and is configured for communicating with the secondary circuit board 68.

Specifically, during operation of the assembly 12, the first treatment tank 14 is placed in service prior to the second treatment tank 16. In the service phase (i.e., the normal operating phase), raw water flows through the first raw water inlet 28 and the first treatment tank inlet 30, entering the tank 14. After being softened in the first treatment tank 14, the softened water flows through the first treatment tank outlet 32 and exits through the bypass outlet 36, where the consumer can use the softened water.

As the first treatment tank 14 operates, the first flow meter 62 tracks the number of gallons flowing through the tank until the impedance difference between the second and first pairs of electrodes 58, 56 reaches the predetermined level. At this point, the sensor probe 54 alerts the controller 60, and specifically the primary circuit board 64, that the ion exchange resin 19 no longer has the capability to soften water, as described above. The microprocessor 70 stores the number of gallons tracked by the first flow meter 62 as "X" gallons. Also at this time, the primary circuit board 64 communicates with the first valve assembly 26, indicating that regeneration is necessary.

During regeneration, the first valve assembly 26 functions such that the treatment tank 14 cycles through the backwash, brine draw, rinse and refill steps, restoring the capacity of the ion exchange resin 19 in the tank to soften water. Each of these steps and the operation of the valve assembly 26 are described in commonly owned and co-pending U.S. Ser. No. 60/997,317, entitled CONTROL VALVE FOR A FLUID TREATMENT SYSTEM.

While the ion exchange resin 19 in the first treatment tank 14 is undergoing regeneration, the second treatment tank 16 is placed in service for the residence or commercial structure. Specifically, the secondary circuit board 68 provides an interface that permits the microprocessor 70 to communicate with the second valve assembly 40 to begin operation. Accordingly, raw water flows through the second raw water inlet 42 and the second treatment tank inlet 44 enabling the raw water to enter the tank 16. After being softened in the second treatment tank 16, the softened water flows through the second treatment tank outlet 46 and exits through the second bypass valve 50, permitting consumer use of the softened water.

During servicing, the second flow meter 72 tracks the number of gallons flowing through the tank 16 until it reaches the "X" gallons value stored in the microprocessor 70. When "X" gallons is reached, the microprocessor 70 communicates with the second valve assembly 40 via the secondary circuit board 68, indicating that the ion exchange resin 21 in the second treatment tank 16 is no longer capable of softening water, and regeneration is necessary.

During regeneration of the second treatment tank 16, the microprocessor 70 communicates with the first valve assembly 26 via the main circuit board 64, placing the first treatment tank 14 in the service phase. This process ensures that one of the tanks 14 or 16 is in the service phase while the other is regenerating, permitting continuous water softening.

To enable the consumer to receive status information regarding the first and second tanks 14, 16 at a location remote from the controller 60, the sensor system 10 further includes a remote display 74 having a main circuit board 76 with a radio transmitter 78 and at least one slot 80 for receiving a minor circuit board 82 and an additional plug-in component, if necessary. The controller 60 is configured for communicating with the remote display 74. Specifically, the "X" gallons data stored in the microprocessor 70 is communicated to the remote display main circuit board 76 via the primary circuit board 64 by either wireless or hardwired communication.

When utilizing wireless communication, the data is sent from a radio transmitter 79 in the primary circuit board 64 to the minor circuit board 82 via the radio transmitter 78, where it is translated from a string of coded numbers/letters to a readable format and sent to the remote display 74, indicating for example that the first treatment tank 14 is in regeneration and the second treatment tank 16 is in service mode.

The present sensor system 10 also enables the data to be sent from the water softener assembly 12 to a service provider network 86. Specifically, the minor circuit board 82 includes a second modem card 88, which translates the data received from the controller 60 into an email message, sends it to the service provider via telephone and logs into the service provider network 86 to display the message in readable format. Accordingly, if the softener 12 is malfunctioning (i.e., the electrodes 56, 58 in the sensor probe 54 are malfunctioning, or the second flow meter 72 stops operating), the service provider can be alerted to the error and schedule an appointment for servicing the softener.

The controller 60 can also directly communicate with the service provider network 86 by sending a signal from the microprocessor 70 to a modem 84, which connects to the service provider network, logs in and displays the message as an email. Additional aspects of the communication between the controller, remote display and service provider are disclosed in commonly owned and co-pending U.S. Ser. No. 60/977,740, entitled COMMUNICATION SYSTEM FOR A WATER SOFTENER SYSTEM, filed Oct. 5, 2007 and herein incorporated by reference.

The present sensor system 10 enables a single controller 60 to regulate two treatment tanks 14, 16, decreasing manufacturing cost and purchase price. Further, the present sensor system 10 permits continuous servicing of the water softener assembly 12, either by the first treatment tank 14 or the second treatment tank 16. In addition, the present sensor system 10 is configured for communicating with a remote display 74 and an off-site service provider network 86, providing status updates and error messages when the softener assembly 12 is malfunctioning.

While a particular embodiment of the present sensor system for a water softener assembly has been described herein, it will be appreciated by those skilled in the art that changes and modifications may be made thereto without departing from the invention in its broader aspects.

What is claimed is:

1. A sensor assembly for a water softening system comprising:
   a first treatment tank having a first valve assembly and a sensor probe;
   a first flow meter within said first treatment tank;
   a second treatment tank having a second valve assembly;
   a second flow meter within said second treatment tank, wherein said first flow meter and said second flow meter are different;
   a brine tank independently connected to each of said first treatment tank and said second treatment tank; and
   a controller configured for communicating with said sensor probe and said first flow meter within said first treatment tank, and said second flow meter within said second treatment tank, said controller configured for communicating with said first valve assembly and said second valve assembly,
   said first flow meter being configured to track a first number of gallons of fluid flowing through said first treatment tank until regeneration is necessary in said first treatment tank, and when regeneration is necessary in said first treatment tank, said controller records said first number of gallons and sends a signal to said first valve assembly to switch from a service phase to a regeneration phase, and triggers operation of said second treatment tank; and
   said second flow meter being configured to track a second number of gallons of fluid flowing through said second treatment tank and, when said second number of gallons of fluid reaches said first number of gallons, said controller sends a signal to said first valve assembly to switch from said regeneration phase to said service phase and to said second valve assembly to switch from a service phase to a regeneration phase.

2. The sensor assembly of claim 1, wherein said sensor probe includes a pair of vertically spaced electrodes configured for detecting an impedance difference of an ion exchange resin in said first treatment tank, and when said impedance reaches a predetermined level, said sensor probe sends a signal to said controller to indicate that regeneration is necessary, and triggers operation of said second treatment tank.

3. The sensor assembly of claim 1, further including a remote display in communication with said controller for allowing control of said first valve assembly and said second valve assembly from a remote location.

4. The sensor assembly of claim 3, wherein said remote display includes a main circuit board and a radio transmitter.

5. The sensor assembly of claim 1, further including a modem in communication with said controller and configured for sending an electronic message providing status updates and error messages.

6. A sensor assembly for a water softening system comprising:
   a first treatment tank having a first valve assembly and a sensor probe;
   a first flow meter within said first treatment tank;
   a second treatment tank having a second valve assembly
   a second flow meter within said second treatment tank, wherein said first flow; meter and said second flow meter are different;
   a brine tank independently connected to each of said first treatment tank and said second treatment tank;
   a controller configured for communicating with said sensor probe and said first flow meter in said first treatment tank, and said second flow meter in said second treatment tank; said controller configured for communicating with said first valve assembly and said second valve assembly and when regeneration is necessary in said first treatment tank, said controller sends a signal to said first valve assembly to switch from a service phase to a regeneration phase, and triggers operation of said second treatment tank; and
   a remote display in communication with said controller for allowing control of said first valve assembly and said second valve assembly from a remote location,
   said sensor probe including a pair of vertically spaced electrodes configured for detecting an impedance difference of an ion exchange resin in said first treatment tank, and when said impedance reaches a predetermined level, said sensor probe sends a signal to said controller to indicate that regeneration is necessary, and triggers operation of said second treatment tank,
   said second flow meter configured for tracking a number of gallons of fluid flowing through said second treatment tank and when said number of gallons of fluid reaches a number of gallons needed for regeneration in said first treatment tank, said controller sends a signal to said first valve assembly to switch from said regeneration phase to said service phase and to said second valve assembly to switch from a service phase to a regeneration phase.

7. The sensor assembly of claim 6, which includes a modem in communication with said controller, said modem operable to send an electronic message for providing status updates and error messages.

8. A method for controlling a water softening system, said water softening system comprising a sensor assembly as defined by claim 1, comprising:
   providing a first treatment tank having a first valve assembly, a first flow meter and a sensor probe;
   providing a second treatment tank having a second valve assembly and a second flow meter;
   independently connecting a brine tank to each of said first treatment tank and said second treatment tank;
   communicating with said sensor probe and said first flow meter in said first treatment tank, and said second flow meter in said second treatment tank; and
   sending a message to an off-site service provider network reporting a condition of the water softening system.

9. The method of claim 8, wherein communicating with said sensor probe and said first flow meter includes remotely communicating with said sensor probe and said first flow meter using a remote display for controlling the water softening system from a remote location.

10. The method of claim 8, wherein said condition includes at least one of status updates and error messages related to the water softening system.

* * * * *